US008422495B2

(12) United States Patent
Wing et al.

(10) Patent No.: US 8,422,495 B2
(45) Date of Patent: Apr. 16, 2013

(54) TRIGGERING BANDWIDTH RESERVATION AND PRIORITY REMARKING

(75) Inventors: Daniel G. Wing, San Jose, CA (US); Bruce Davie, Cambridge, MA (US); John Restrick, Palo Alto, CA (US); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 12/893,975

(22) Filed: Sep. 29, 2010

(65) Prior Publication Data
US 2011/0032940 A1    Feb. 10, 2011

Related U.S. Application Data

(62) Division of application No. 11/564,808, filed on Nov. 29, 2006, now Pat. No. 7,822,046.

(60) Provisional application No. 60/829,467, filed on Oct. 13, 2006.

(51) Int. Cl.
*H04L 12/28* (2006.01)
(52) U.S. Cl.
USPC .......................................... 370/389; 370/392
(58) Field of Classification Search ........................ None
See application file for complete search history.

(56) References Cited

U.S. PATENT DOCUMENTS

| | | | |
|---|---|---|---|
| 6,748,435 B1 * | 6/2004 | Wang et al. ................... | 709/225 |
| 6,765,905 B2 * | 7/2004 | Gross et al. ................... | 370/389 |
| 7,272,651 B1 * | 9/2007 | Bolding et al. ............... | 709/227 |
| 2002/0136217 A1 * | 9/2002 | Christensen ................... | 370/393 |
| 2003/0198220 A1 * | 10/2003 | Gross et al. ................... | 370/389 |
| 2004/0213150 A1 * | 10/2004 | Krause et al. ................. | 370/229 |
| 2005/0259637 A1 * | 11/2005 | Chu et al. ...................... | 370/352 |
| 2006/0153242 A1 * | 7/2006 | Krause et al. ................. | 370/493 |
| 2007/0076729 A1 * | 4/2007 | Takeda .......................... | 370/401 |
| 2007/0201499 A1 * | 8/2007 | Kapoor et al. ................ | 370/412 |
| 2008/0020775 A1 * | 1/2008 | Willars ......................... | 455/445 |
| 2008/0089324 A1 * | 4/2008 | Polk et al. ..................... | 370/389 |
| 2008/0192753 A1 * | 8/2008 | Li ............................. | 370/395.21 |
| 2008/0279196 A1 * | 11/2008 | Friskney et al. ......... | 370/395.53 |

OTHER PUBLICATIONS

U.S. Appl. No. 11/564,808, filed Nov. 29, 2006.
Stolowitz Ford Cowger LLP, Listing of Related Cases, Nov. 21, 2011.

* cited by examiner

Primary Examiner — Otis L Thompson, Jr.
(74) Attorney, Agent, or Firm — Lempia Summerfield Katz LLC

(57) ABSTRACT

In one embodiment, a reservation proxy monitors for received connectivity check messages or beginning-of-media-flow indication messages. When either type of message is observed, the reservation proxy requests resource allocation for a media flow associated with the received message. The amount of resource allocation requested may be coordinated by exchanging messages with a call controller or policy server for one of the endpoints of the media flow, or the amount of resource allocation may be identified within the received message.

19 Claims, 7 Drawing Sheets ated in FIG. 6.

TRIGGERING BANDWIDTH RESERVATION AND PRIORITY REMARKING

CROSS REFERENCE TO RELATED APPLICATIONS

This application is a divisional of U.S. patent application Ser. No. 11/564,808 filed Nov. 29, 2006, now U.S. Pat. No. 7,822,046 which claims the benefit from U.S. Provisional Patent Application No. 60/829,467 filed Oct. 13, 2006, the disclosures of which are both incorporated herein by reference in their entirety.

TECHNICAL FIELD

The present disclosure relates generally to the field of networking.

BACKGROUND

An endpoint transferring media can reserve network resources for the media flow by sending a Resource ReSerVation (RSVP) protocol request. The endpoint typically sends a resource request in conjunction with establishing the media flow.

The RSVP protocol is not available on many endpoints, and accordingly, RSVP proxies located remotely from the endpoints have been used to send RSVP requests on behalf of endpoints. The RSVP proxies determine when RSVP requests should be initiated on behalf of an associated endpoint using methods such as stateful packet analysis. Under stateful packet analysis, the RSVP proxy analyzes packets for all media flows extending through itself. Whenever the RSVP proxy detects a new media flow, the RSVP proxy observes the flow type. The RSVP proxy then uses the flow type observation to heuristically determine resource requirements for the new flow and sends an RSVP request using the determined requirements. To ensure that resources are reserved for the lifetime of the flow, the RSVP proxies maintain state tables denoting previously analyzed flows.

The heuristically determined bandwidth requirements are frequently inaccurate and maintenance of the state tables by the RSVP proxies consumes local resources. The disclosure that follows solves these and other problems.

DESCRIPTION OF EXAMPLE EMBODIMENTS

Overview

Figure 1:
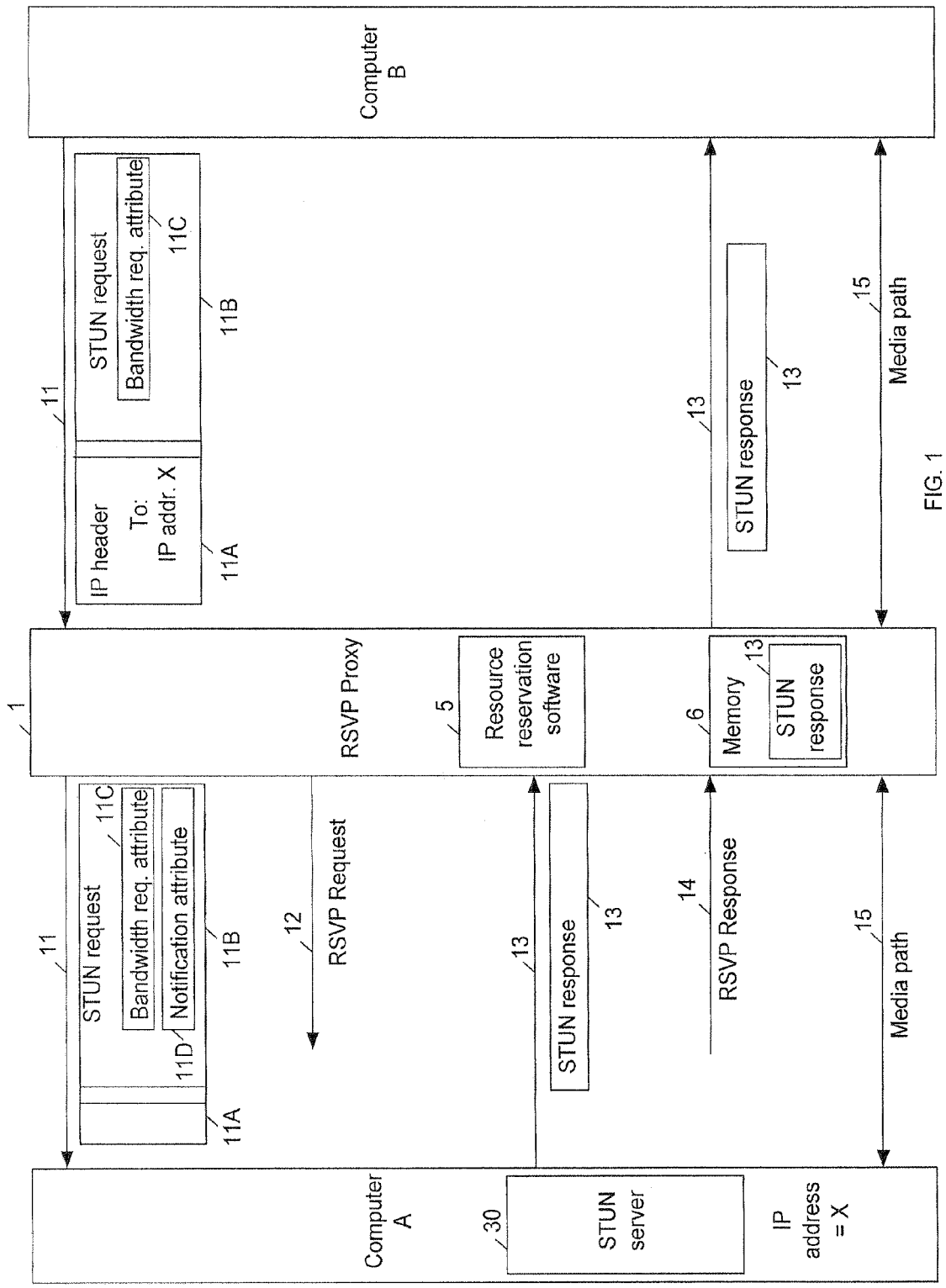
FIG. 1 illustrates an example Resource ReSerVation (RSVP) proxy for triggering RSVP requests in response to Simple Traversal of User Datagram Protocol (UDP) Through Network Address Translators (NATs) (STUN) messages.

In one embodiment, a reservation proxy monitors for received connectivity check messages or other beginning-of-media-flow indication messages. When either type of message is observed, the reservation proxy requests resource allocation for a media flow associated with the received message. The amount of resource allocation requested may be coordinated by exchanging messages with a call controller or policy server for one of the endpoints of the media flow, or the amount of resource allocation may be identified within the received message.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example RSVP proxy for triggering RSVP requests in response to STUN messages.

Referring to FIG. 1, computers A and B use Interactive Connectivity Establishment (ICE) or a similar protocol so that a media path 15 can be established between them. During the initial stages of ICE, call controllers (not shown) for each of computers A and B exchange signaling messages. During a later stage of ICE, as part of a connectivity check, computer B generates a STUN request message 11 addressed to STUN server 30 located on computer A. STUN is a protocol used for Network Address Translator (NAT) discovery and for NAT binding verifications, which has also been leveraged to facilitate connectivity checks during ICE.

The RSVP proxy 1 that is located between computers A and B receives traffic exchanged between those endpoints. According to resource reservation software 5, the RSVP proxy 1 monitors received traffic to determine whether the received traffic includes a STUN request or other messages sent using a network address translator discovery protocol. The RSVP proxy 1 may use any method to identify STUN requests, such as looking for a STUN magic cookie. Although in the present example the proxy 1 is an RSVP type, in other examples a Next Steps In Signaling (NSIS) device or any other reservation proxy may be used.

The STUN request 11 is received and the RSVP proxy 1 identifies the STUN request 11B included within. The RSVP proxy 1 also examines an attached IP header 11A to determine whether the STUN request 11B is a peer-to-peer connectivity check type or another type such as a NAT binding verification.

Any method of distinguishing peer-to-peer connectivity check type STUN messages from other types may be used. In the present example, the RSVP proxy 1 observes the destination address X included in the IP header 11A, which is compared to a local table or database. When the comparison identifies that the destination address does not correspond to a public STUN server used for binding verification, the RSVP proxy 1 concludes that the STUN request 11B is sent to a peer that is configured to receive media, such as voice or video. Other methods of distinguishing the STUN request type may be used, such as filtering out STUN requests addressed to UDP port 3478, which is typically used for NAT binding verifications. When destination addresses for received STUN requests correspond to a network device that is not configured to receive media, such as a public STUN server, the STUN requests are forwarded without sending a reservation request.

Figure 6:
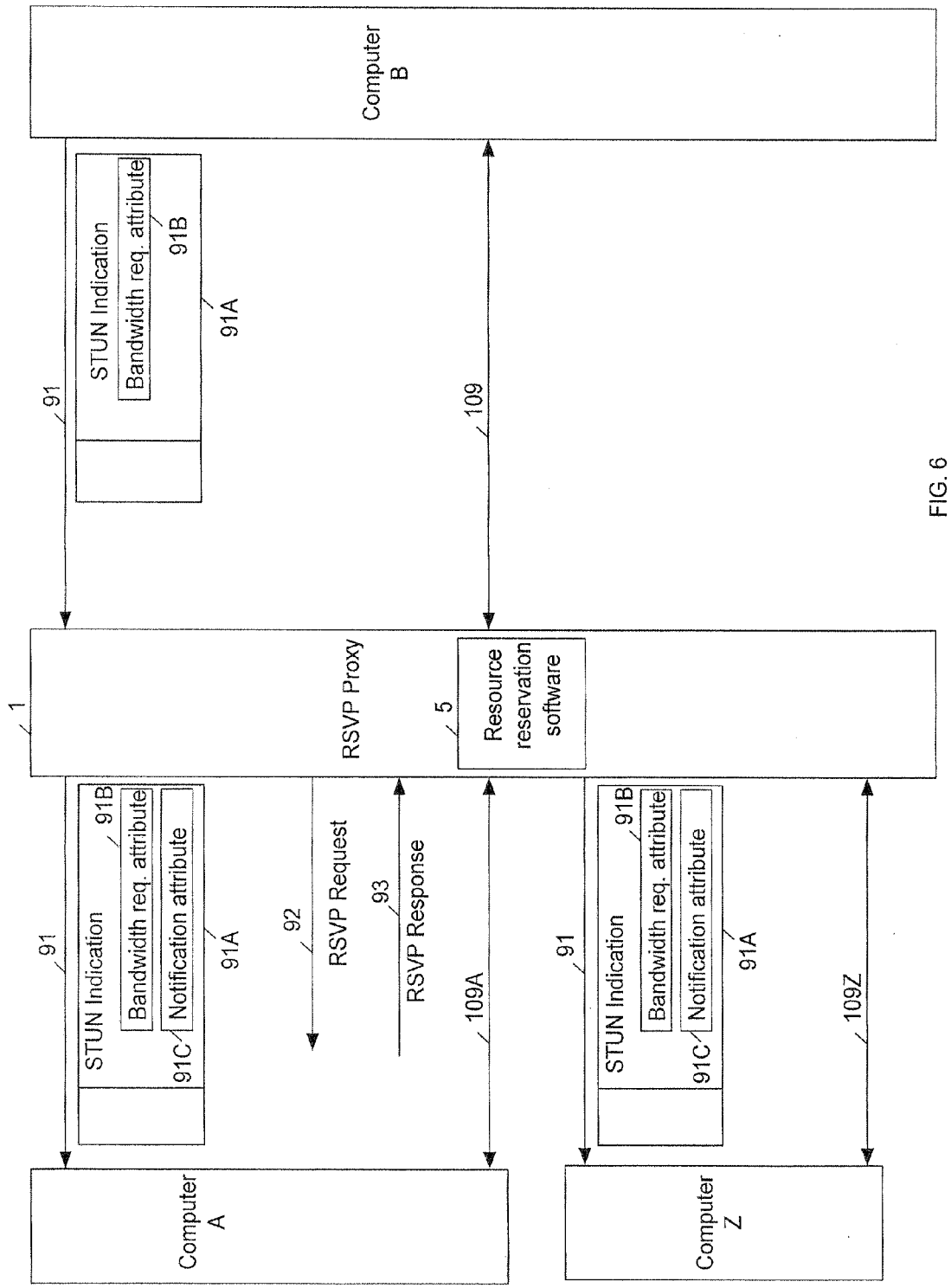
FIG. 6 illustrates another example of the RSVP proxy illustrated in FIG. 1.

Another embodiment uses STUN Indication messages, which are sent from computer B to computer A and do not elicit a STUN response. These STUN Indication messages contain the same bandwidth information, but are not part of an ICE exchange and do not elicit a connectivity check. The embodiment using STUN Indications is illustrated in FIG. 6.

Referring again to FIG. 1, when the STUN request 11B is a peer-to-peer connectivity check type, the RSVP proxy 1 checks the STUN request 11B for a bandwidth request attribute 11C. When computer B or a call controller for computer B caused the bandwidth request attribute 11C to be inserted into the STUN request 11B, the RSVP proxy 1 is able to determine an amount of bandwidth associated with the call. In other words, the resource amount is determined without requiring heuristical determination by the RSVP proxy 1. In other examples, the STUN request 11B does not include the attribute 11C and the RSVP proxy 1 uses any method of heuristically determining a required amount of bandwidth for the call, including heuristical determination based on call type.

The RSVP request 12 or another similar resource request may be sent to another RSVP proxy (not shown). In such a case, network resources are requested to be reserved by network devices such as routers located between the RSVP proxy 1 and the other RSVP proxy (not shown). Alternatively, the RSVP request 12 may instead be sent to computer A if computer A is configured with RSVP or similar protocol. In that case, network resources are requested to be reserved between the RSVP proxy 1 and the computer A.

The RSVP proxy 1 also attaches a notification attribute 11D to the STUN request 11A before forwarding the STUN request message 11. The notification attribute is added at the end of the STUN request message 11, outside an integrity-check protected portion. The notification attribute 11D notifies any other proxies located between the RSVP proxy 1 and the computer A that the STUN request message 11 has already triggered a resource reservation request. In other words, this attribute 11D may be used to prevent multiple resource reservations to be requested for a same media flow.

The RSVP proxy 1 may receive back a STUN response 13 before receiving back the RSVP response 14, depending on network congestion and other factors. When the STUN response 13 is received first, the RSVP proxy 1 may optionally store the STUN response 13 in a local memory 6 until determining whether resources are reserved.

Delayed forwarding of the STUN response 13 until receiving the RSVP response 14 is advantageous particularly in the instance when resources are not available for the RSVP request 12. In such a case, the RSVP proxy 1 determines that no resources are available and then drops the STUN response 13 without forwarding. As a result, computer B does not complete the peer-to-peer connectivity check, which disrupts the ICE exchange and prevents the media flow 15 from being established between the computers A and B. Preventing the media flow 15 when the network is too congested is helpful as an overloaded network is prevented from becoming further overloaded and potentially dropping, or causing degradation of, already established connections.

When the RSVP response 14 indicates that resources are available, the RSVP proxy 1 forwards the STUN response 13 allowing the ICE process to complete between computers A and B. As a result, media path 15 is established between computers A and B. The media path 15 uses reserved resources, so that computers A and B are assured some minimum guaranteed level of Quality of Service (QoS).

Figure 2:
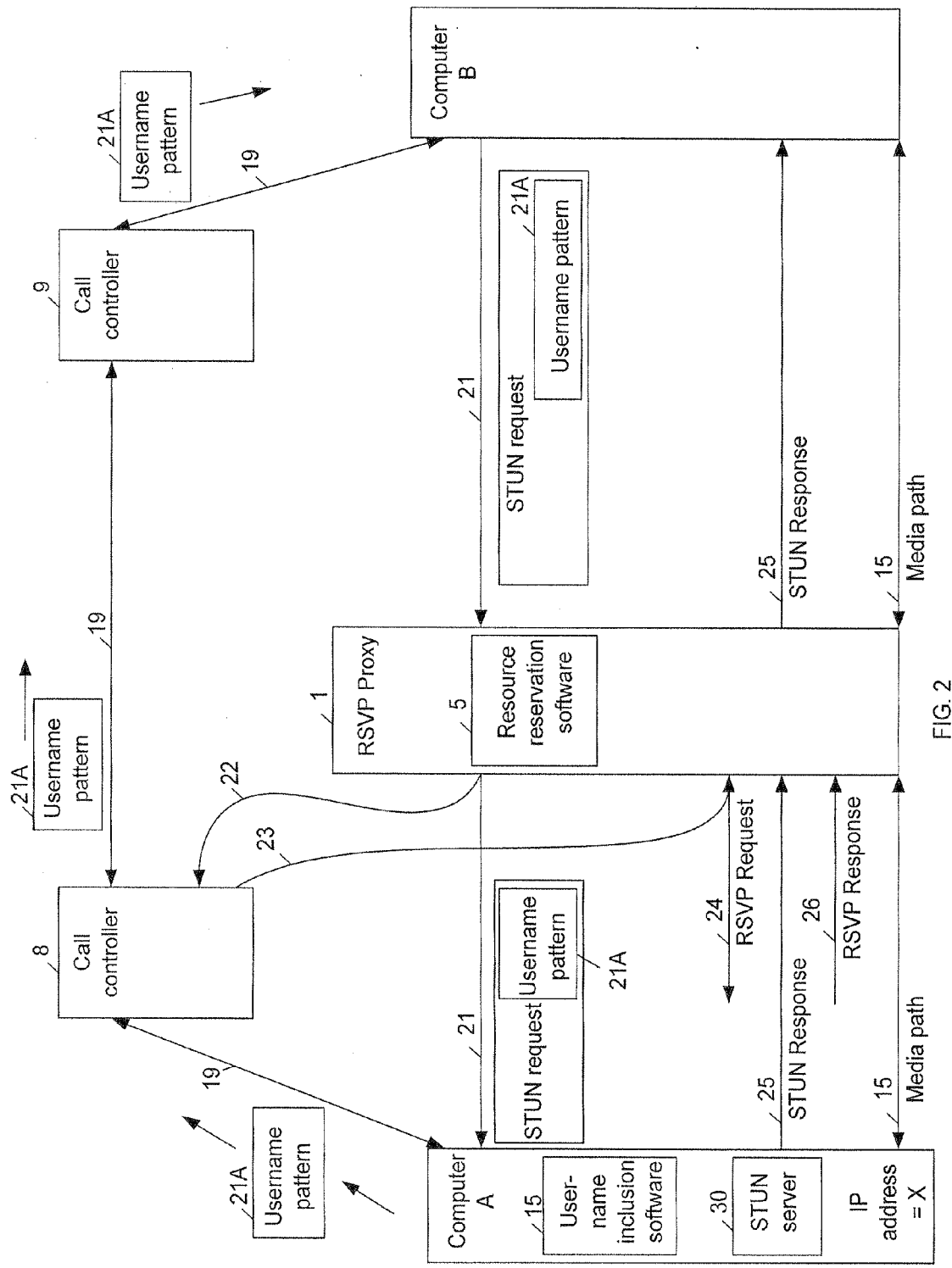
FIG. 2 illustrates an example of the RSVP proxy illustrated in FIG. 1 for requesting resource requirements from a call controller.

FIG. 2 illustrates an example of the RSVP proxy illustrated in FIG. 1 for requesting resource requirements from a call controller.

Referring to FIG. 2, during ICE or a similar connectivity establishment protocol, username inclusion software 15 on computer A provides, to computer B, a username pattern 21A that is associated with the call controller 8. This username pattern 21A may include an encoding of an IP address for the call controller 8 for computer A or some other value that allows RSVP proxy 1 to identify call controller 8 from other call controllers on the network. When ICE is the protocol used for connectivity establishment, the username pattern 21A may be transferred within the signaling messages 19 that are exchanged during the initial stages of ICE. In other examples, the username pattern 21A may be provided by software located on call controller 8 instead of computer A. Accordingly, when a STUN request 21 is generated by computer B, the username pattern 21A is included within STUN request 21.

The RSVP proxy 1 receives the STUN request 21 and may perform any of the processes previously described with respect to FIG. 1. Additionally, in this example the RSVP proxy 1 locates the username pattern 21A. The RSVP proxy 1 decodes the username pattern 21A to identify the IP address for call controller 8. Using the decoded IP address (or any other value that allows identification of call controller 8 from other network devices located on the network), the RSVP proxy 1 sends request 22. Request 22 solicits the call controller 8 to provide an amount of bandwidth needed to exchange media between the computers A and B.

Once the RSVP proxy 1 receives back a response 23 that identifies an amount of bandwidth required for the media exchange, an RSVP request 24 is generated. The RSVP request 24 requests resources sufficient to transfer the bandwidth amount indicated by response 23.

After sending STUN request 21 and RSVP request 24, the RSVP proxy 1 receives back STUN response 25 and RSVP response 26 in any order depending on network congestion. The STUN response 25, which may be correlated to the STUN request 21 using a STUN transaction identifier, may be temporarily stored or immediately forwarded to computer B. Once computers A and B complete ICE, a media flow 15 is established using the reserved resources.

Figure 3:
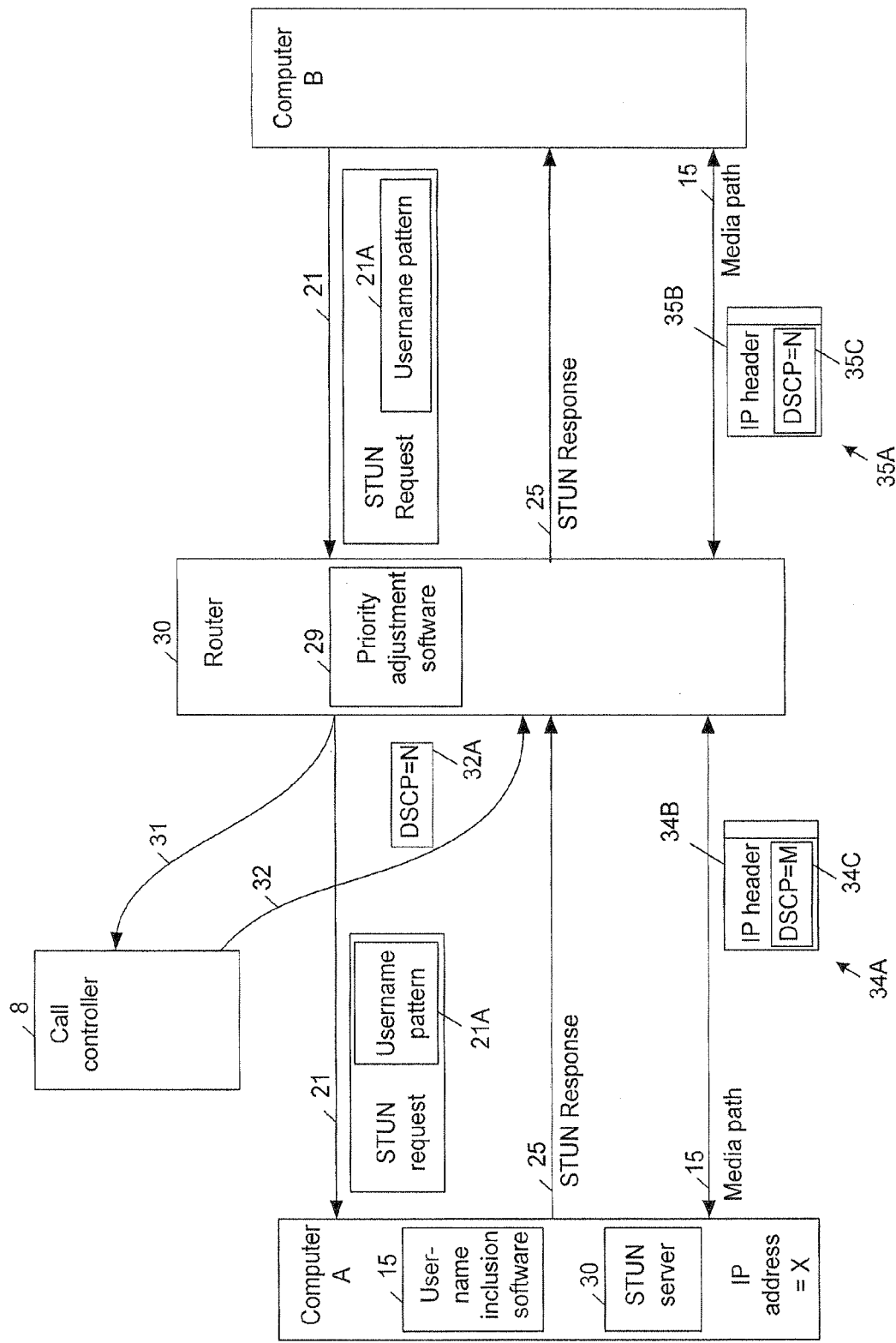
FIG. 3 illustrates an example router for triggering priority remarking of media packets in response to STUN messages.

FIG. 3 illustrates an example router for triggering priority remarking of media packets in response to STUN messages.

Referring to FIG. 3, a network device such as router 30 located between the computers A and B may also receive the STUN request 21. The router 30 may receive the STUN request 21 before or after the RSVP proxy 1 described in FIGS. 1 and 2. The router 30 may be located on a call path that does not extend through the RSVP proxy or any other reservation device. In other words, priority remarking may be used on a call that does not use reserved resources and which does not elicit reservation attempts by proxies, endpoints or other devices. Although in this example, the priority adjustment software 29 is located on router 30, in other examples the software 29 is located on any other network device that is capable of adjusting priority values included in media packets.

In response to receiving STUN request 21, the router 30 determines a value to be used in a Differentiated Services Code Point (DSCP) field or other priority field for media packets in an associated media flow. In the present example, a request 31 is made using the username pattern 21A to ask call controller 8 for the priority value. In other examples, any of the previously described methods may be used, including observing an indication of an attribute included in the STUN request 21 or using heuristical determination to identify an appropriate priority value. The router 30 receives back, in any order, a STUN response 25 and a response 32 identifying the DSCP value indication 32A that is equal to N.

After receiving the STUN response 25, a media flow 15 is established that extends through the router 30. The media flow 15 includes various media packets such as IP packet 34A. The IP packet 34A includes an IP header 34B having a DSCP value field 34C that is equal to some value such as value M.

The router observes the value M included in the DSCP value field 34C of the received IP packet 34A. The observed value M is then compared to the value N specified by the call controller 8. Accordingly, since there is a difference in this example, the router 30 formats the IP packet 34A according to the indicated DSCP value N. The router 30 then forwards the formatted IP packet 35A having IP header 35B and a DSCP field 35C set to value N.

The router 30 may perform this priority remarking on every media packet included in the media flow 15. Accordingly, when a different router (not shown) located between router 30 and computer B receives the formatted media packets, the different router processes the media packets according to the priority value N. The remarking by router 30 thus may increase or decrease the priority of the media flow 30 to better match current network congestion.

Also, this renumbering allows the packets to travel through a network for computer A at a first priority, and then travel through a network for computer B at a second priority. This may be advantageous, for example, when the different networks serve different types of traffic. For example, when the network for computer A is a network that primarily exchanges traffic of a personal nature, the media flow may receive a relatively high priority while traversing the personal network. Then, when entering a network serving primarily business traffic, the media flow 15 may be remarked by the router 30 to a different priority that is relatively low for the business network.

Figure 4:
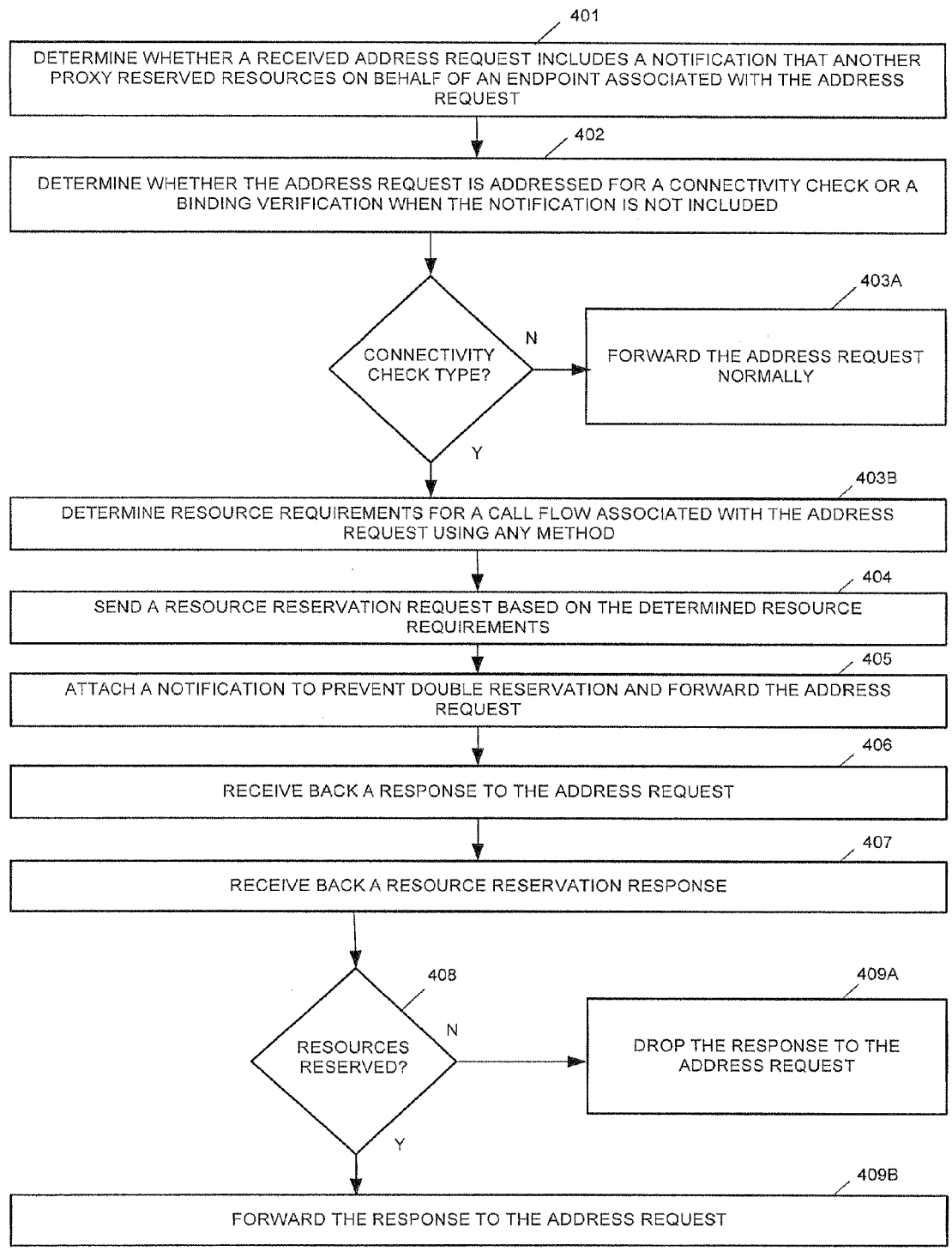
FIG. 4 illustrates an example method for using the RSVP proxy illustrated in FIGS. 1-2.

FIG. 4 illustrates an example method for using the RSVP proxy illustrated in FIGS. 1-2.

In block 401, the proxy 1 determines whether a received address request includes a notification that another proxy reserved resources on behalf of an endpoint associated with the address request. When the notification is not included, in block 402 the proxy 1 determines whether the address request is addressed for a connectivity check or a binding verification. Address requests that are not addressed for a connectivity check are forwarded normally in block 403A.

When the address request is addressed for a connectivity check, in block 403B the proxy 1 determines resource requirements for a call flow associated with the address request using any method. Next, in block 404 the proxy 1 sends a resource reservation request based on the determined resource requirements. The proxy 1 also attaches a notification to the address request to prevent double reservation, and then forwards the address request in block 405.

In block 406, the proxy 1 receives back a response to the address request, which may be stored until a resource reservation response is received. The proxy 1 also receives back the resource reservation response in block 407.

In block 408, the proxy 1 determines whether the resources are reserved according to the resource reservation response. When the resources are not reserved, in block 409A the proxy 1 drops the response to the address request. When the resources are reserved, in block 409B the proxy 1 forwards the response to the address request.

Figure 5:
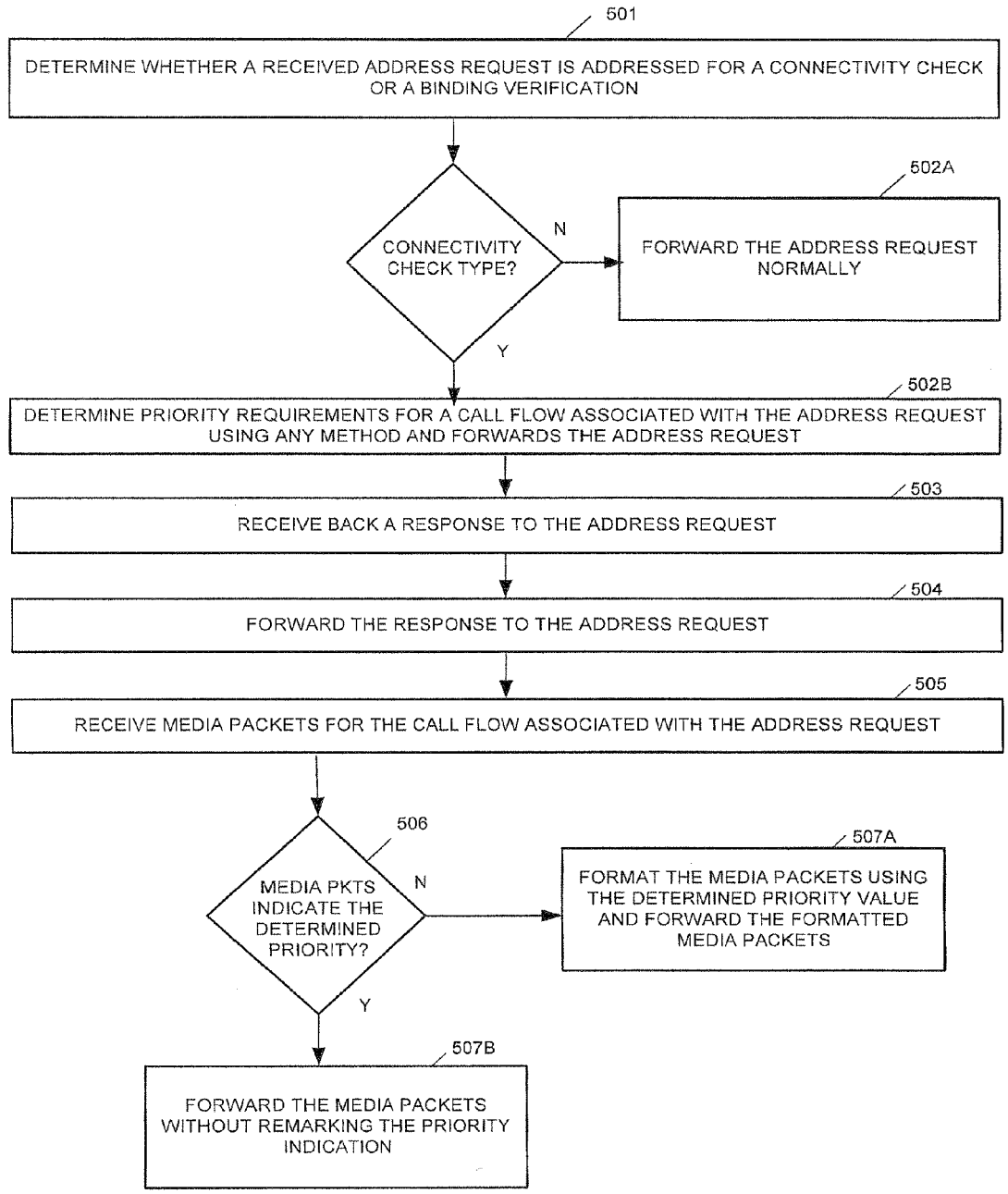
FIG. 5 illustrates an example method for using the router illustrated in FIG. 3.

FIG. 5 illustrates an example method for using the router illustrated in FIG. 3.

In block 501, the router 30 determines whether a received address request is addressed for a connectivity check or a binding verification. When the received address request is not addressed for a connectivity check, in block 502A the router 30 forwards the address request normally.

When the received address request is addressed for a connectivity check, in block 502B the router 30 determines priority requirements for a call flow associated with the address request using any method and also forwards the address request. In block 503, the router 30 receives back a response to the address request. The router 30 forwards the response to the address request in block 504.

In block 505, the router 30 receives media packets for the call flow associated with the address request. The router 30 determines whether the media packets indicate the determined priority in block 506. When the media packets do not indicate the determined priority, in block 507A the router 30 formats the media packets using the determined priority value and then forwards the formatted packets. When the media packets do indicate the determined priority, in block 507B the router 30 forwards the media packets without remarking the priority indication.

FIG. 6 illustrates another example of the RSVP proxy illustrated in FIG. 1.

Referring to FIG. 6, computer B needs to establish communications with computers A and Z. To minimize network traffic and for other reasons, computer B is configured to use multicasting to establish the communications. Multicast communications are communications that are sent once, copied at an intermediary device, and then delivered to more than one endpoint (such as hundreds of endpoints or more). When multicasting is used, ICE and STUN requests and responses are not required and are generally omitted.

Since STUN requests are not available to trigger resource reservation in a multicast scenario, other types of beginning-of-media-flow indications may be used to trigger resource reservation or priority remarking. Generally, any type of message can be used as a beginning-of-media-flow indication. Types of messages that are usable as beginning-of-media-flow indications include STUN Indications, but can also include any other messages that are sent using a protocol typically known to both proxies and endpoints. In the present example, computer B is configured to multicast a STUN Indication 91A to trigger resource reservation and/or priority remarking. A STUN request is retransmitted until a STUN response is received; while a STUN Indication has no corresponding response. This makes STUN Indications suitable for large multicast groups.

RSVP proxy 1 receives the communication 91 including the STUN Indication 91A. The software 5 uses any method to determine an appropriate bandwidth value for an associated media flow, such as processing the bandwidth request attribute 91B included within the communication 91. The RSVP proxy 1 then sends one or more RSVP requests 92 used to reserve resources for media flows to the computers A and Z. The amount of resources requested in the RSVP request 92 is set according to the bandwidth request attribute 91B.

The RSVP proxy 1 may also attach a notification attribute 91C to the STUN Indication 91A before copying and forwarding the STUN Indication 91A to computers A and Z. In other examples, the RSVP proxy 1 instead forwards the STUN Indication 91A to another intermediary device that then performs the multicast processing including copying and forwarding. The attribute 91C may be used to prevent duplicate resource reservations.

Finally, computer B uses multicasting to establish a media path 109. The multicast media path 109 includes media path legs 109A and 109Z, which are established over the reserved resources.

Figure 7:
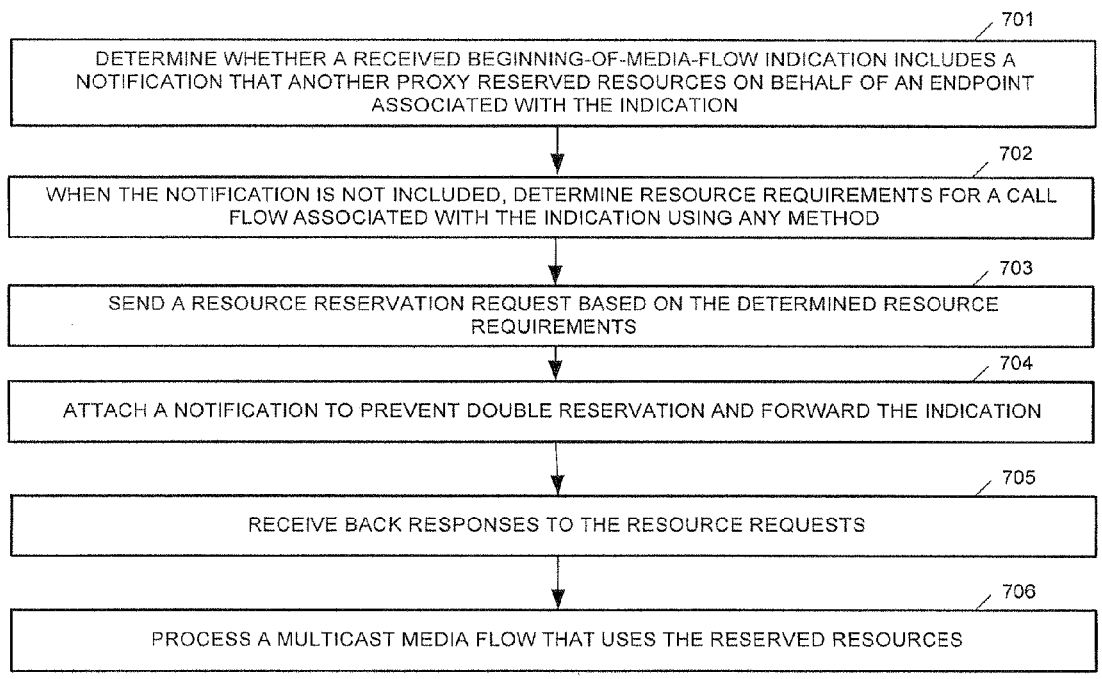
FIG. 7 illustrates an example method of using the RSVP proxy illustrated in FIG. 6.

FIG. 7 illustrates an example method of using the RSVP proxy illustrated in FIG. 6.

In block 701, the proxy 1 determines whether a received beginning-of-media-flow indication includes a notification that another proxy reserved resources on behalf of an endpoint associated with the indication. When the notification is not included, in block 702 the proxy 1 determines resource requirements for a call flow associated with the received indication using any method. Next, in block 703 the proxy 1 sends one or more resource reservation requests based on the determined resource requirements. The proxy 1 also attaches a notification to the received indication to prevent double reservation, and then forwards the indication in block 704.

In block 705, the proxy 1 may receive back one or more responses to the resource requests. In block 706, the proxy 1 processes a multicast media flow that uses the reserved resources.

The above examples are described with respect to computers establishing a call. In other examples, the methods described above may be used to reserve resources for calls between any other endpoints such as a personal computer, an IP phone, a Personal Digital Assistant (PDA), a cell phone, a smart phone, a Publicly Switched Telephone Network (PSTN) gateway, etc.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
  a processing device; and
  a memory coupled to the processing device comprising instructions executable by the processing device, the processing device operable when executing the instructions to:
  monitor for a message having a predetermined message type that corresponds to a beginning of a media flow;
  identify a priority value that corresponds to the media flow;
  receive packets for the media flow, the packets having an indicated priority;
  replace the indicated priority with the identified priority value;
  forward a representation of the packets that includes the identified priority value;
  decode an attribute included in the received packets to identify a network address for a call management device; and
  exchange communications with the call management device using the network address to identify the priority value.

2. The apparatus of claim 1, wherein said replacing comprises Differentiated Services Code Point (DSCP) remarking.

3. The apparatus of claim 1, wherein the processing device is further operable to:
  identify resource requirements for the media flow associated with the message; and
  request reservation of network resources according to the identified resource requirements.

4. The apparatus of claim 1, wherein the attribute is
  a Simple Traversal of User Datagram Protocol (UDP) Through Network Address Translators (NATs) (STUN) attribute included in the received packets to identify the network address for the call management device.

5. The apparatus of claim 1, wherein the processing device is further operable to use heuristical determination to identify the priority value.

6. The apparatus of claim 1, wherein the packets are communicated over a first portion of the media path using the indicated priority and the packets are communicated over a second portion of the media path using the identified priority value that is different than the indicated priority.

7. An apparatus, comprising:
  a processing device; and
  a memory coupled to the processing device comprising instructions executable by the processing device, the processing device operable when executing the instructions to:

monitor for a message having a predetermined message type that indicates a beginning of a media flow;
determine whether the message includes an indication inserted by a remote reservation proxy;
identify a resource requirement or priority value that corresponds to the media flow in response to detecting the message, wherein the resource requirement is identified when the indication is inserted by a device other than the remote reservation proxy;
when the resource requirement is identified, request reservation of network resources for the media flow according to the identified resource requirement; and
when the priority value is identified, format received packets corresponding to the media flow using the identified priority value before forwarding the formatted packets from a network device to a remote device.

8. The method of claim 7, wherein said formatting comprises Differentiated Services Code Point (DSCP) remarking.

9. The apparatus of claim 7, wherein the processing device is further operable to:
decode a Simple Traversal of User Datagram Protocol (UDP) Through Network Address Translators (NATs) (STUN) attribute included in the message to identify a network address for a call management device; and
exchange communications with the call management device using the network address to identify the resource requirement or identified priority value.

10. The apparatus of claim 7, wherein the processing device is further operable to use heuristical determination to identify the priority value.

11. The method of claim 7, wherein the packets are communicated over a first portion of the media path using the indicated priority and the packets are communicated over a second portion of the media path using the identified priority value that is different than the indicated priority.

12. A method, comprising:
monitoring for a network address translation discovery message having a predetermined message type that corresponds to a beginning of a media flow;
identifying a priority value that corresponds to the media flow;
receiving packets for the media flow, the packets having an indicated priority;
checking if the indicated priority is different than a priority represented by the identified priority value;
formatting the indicated priority according to the identified priority value when the indicated priority is different than the identified priority value according to said checking;
forwarding a representation of the packets that includes the formatted priority;
decoding an attribute included in the packets to identify a network address for a call management device; and
exchanging communications with the call management device using the network address to identify the priority value.

13. The method of claim 12, wherein said formatting comprises Differentiated Services Code Point (DSCP) remarking.

14. The method of claim 12, further comprising:
identifying resource requirements for the media flow associated with the network address translation discovery message; and
requesting reservation of network resources according to the identified resource requirements.

15. The method of claim 12, wherein the attribute is a Simple Traversal of User Datagram Protocol (UDP) Through Network Address Translators (NATs) (STUN) attribute included in the received packets to identify the network address for the call management device.

16. The method of claim 12, further comprising using heuristical determination to identify the priority value.

17. The method of claim 12, wherein the packets are communicated over a first portion of the media path using the indicated priority and the packets are communicated over a second portion of the media path using the identified priority value that is different than the indicated priority.

18. The method of claim 12, further comprising increasing or decreasing flow priority based on network conditions.

19. The method of claim 12, further comprising receiving the packets at a network device located at the edge of a first network, performing said formatting using the network device and then forwarding the packets over a second different network; wherein said formatting at the edge network device causes the packets to be forwarded by the edge network device over the second different network with a different priority marking than used for the packets on the first network.

* * * * *